United States Patent [19]
Scott, Jr.

[11] 3,913,541
[45] Oct. 21, 1975

[54] SELF-MODULATING AIR BLEED APPARATUS AND METHOD FOR INTERNAL COMBUSTION ENGINE

[75] Inventor: Milford M. Scott, Jr., Oak View, Calif.

[73] Assignee: STP Corporation, Fort Lauderdale, Fla.

[22] Filed: Feb. 8, 1974

[21] Appl. No.: 440,768

[52] U.S. Cl.... 123/119 D; 123/119 B; 123/119 DB; 123/124 R
[51] Int. Cl.[2] .......................................... F02M 23/04
[58] Field of Search...... 123/119 B, 119 DB, 124 R, 123/119 D

[56] References Cited
UNITED STATES PATENTS

| | | | |
|---|---|---|---|
| 2,152,028 | 3/1939 | Church | 123/124 R |
| 2,688,957 | 9/1954 | Culp | 123/124 R |
| 3,034,492 | 5/1962 | Harmon | 123/124 R |
| 3,176,670 | 4/1965 | Sinbaldi | 123/119 B |
| 3,242,915 | 3/1966 | Blacker | 123/119 B |
| 3,463,132 | 8/1969 | Krieck | 123/119 B |
| 3,809,035 | 5/1974 | Winton | 123/119 B |

Primary Examiner—Wendell E. Burns
Attorney, Agent, or Firm—Molinare, Allegretti, Newitt & Witcoff

[57] ABSTRACT

The disclosure describes a self-modulating air bleed system in which air is introduced continuously into the intake manifold of an internal combustion engine through a first channel and is introduced periodically into the intake manifold through a second channel which is modulated by the vacuum conduit used to control the vacuum advance unit of the engine spark distributor. The first channel is manually adjusted in order to control the amount of air bleed while the engine is idling.

11 Claims, 5 Drawing Figures

3,913,541

SELF-MODULATING AIR BLEED APPARATUS AND METHOD FOR INTERNAL COMBUSTION ENGINE

BACKGROUND AND SUMMARY OF THE INVENTION

This invention relates to an apparatus and method for controlling the exhaust emissions of an internal combustion engine and more particularly relates to an apparatus and method for automatically controlling the amount of air bled into an intake manifold of an internal combustion engine.

Recently, Congress has enacted legislation regulating the exhaust emissions produced by new vehicles sold in the United States. California is the lead state in requiring similar control of the exhaust emissions of used vehicles. At the present time, used vehicles typically have closed crankcase ventilating systems, but do not have more sophisticated types of emission control apparatus.

With the advent of legislation regulating the exhaust emissions of used vehicles, it is important to provide inexpensive exhaust emission control equipment that can be easily installed on such vehicles and can be maintained at low cost.

The applicant has invented an emission control system which is inexpensive to manufacture, contains only one moving part, and can be installed on a vehicle by using only a pocket knife. One feature of the invention is the discovery that exhaust pollutants can be substantially reduced by bleeding air into the intake manifold of an internal combustion engine in an amount modulated by the pressure in the vacuum advance line used to operate the vacuum control unit of the engine spark distributor.

According to another feature of the invention, one air channel between the atmosphere and the intake manifold is continuously open to supply air at all times when the engine is running, and a second air channel has an opening which is modulated by the pressure in the spark distributor vacuum advance line of the engine. When the engine is idling and at full throttle, the second channel is closed, and at operating conditions between idle and full throttle, the second channel is opened so that air is supplied both through the first and second channels.

Accordingly, it is a primary object of the present invention to provide an air bleed system which can be quickly and economically installed on existing vehicles of the type having a throttle valve movable within a carburetor between an idle position and an open position.

Another object of the invention is to provide an air bleed system of the foregoing type in which a first channel continuously admits air into the intake manifold of an internal combustion engine. A second channel is closed when the throttle valve of the engine is in the idle and open positions, and is opened when the throttle valve is moved between the idle and open positions.

Still another object of the present invention is to provide a system of the foregoing type in which the first channel may be manually adjusted in order to control the amount of air bled into the intake manifold while the engine is idling.

Yet another object of the invention is to provide an air bleed system of the foregoing type in which the second channel is controlled by valve means utilizing a flexible diaphragm that is operated by the pressure in the spark advance line connected to the engine distributor spark advance unit, and in which the air is bled into the positive crankcase ventilation system of the engine.

DESCRIPTION OF THE DRAWINGS

These and other objects, advantages and features of the present invention will appear in connection with the accompanying drawings, wherein.

DESCRIPTION OF THE PREFERRED EMBODIMENT

Figure 1:
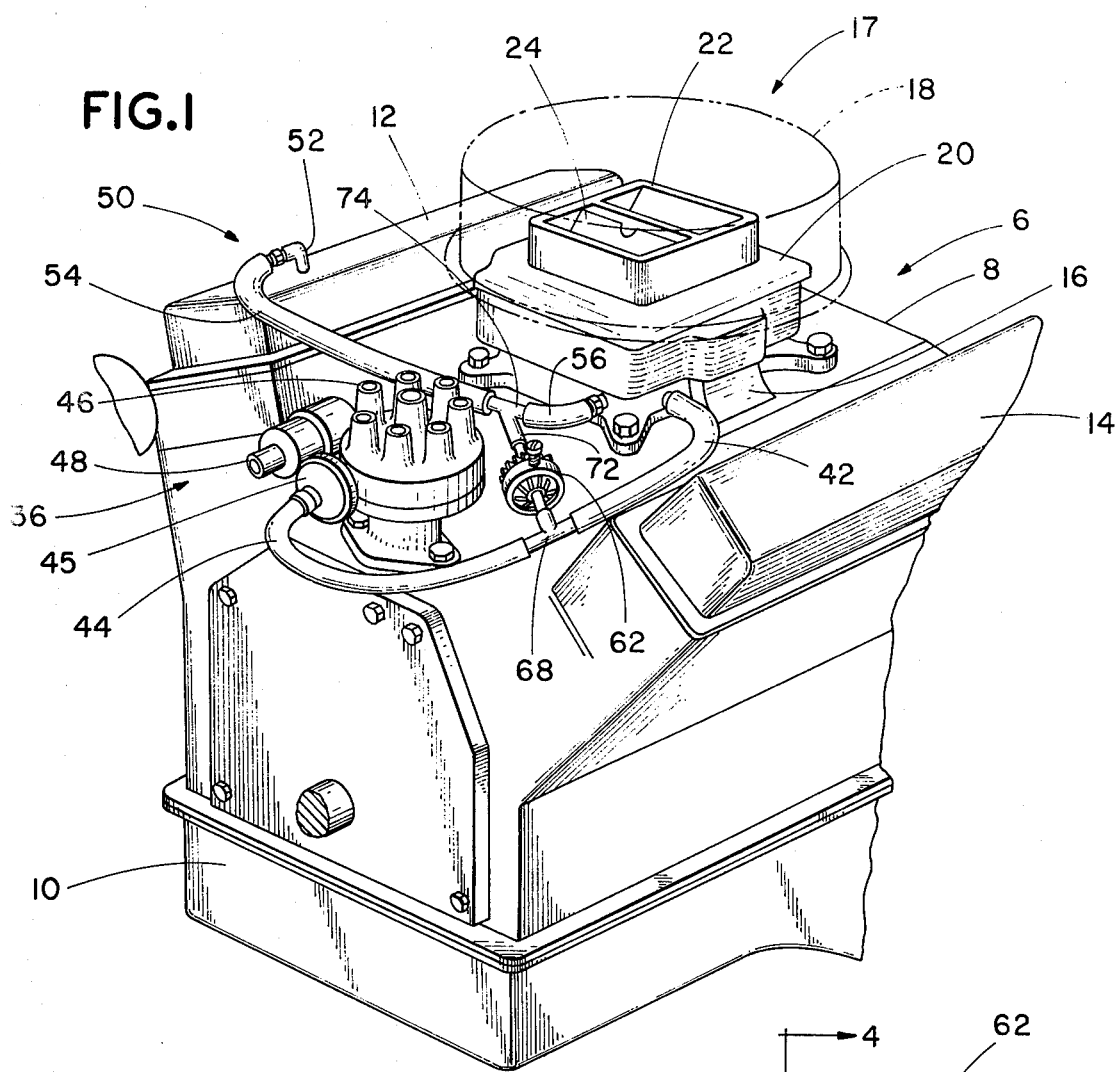
FIG. 1 is a fragmentary, isometric view of an exemplary engine employing a preferred form of air bleed system made in accordance with the present invention.

Referring to the drawings, an exemplary internal combustion engine 6 for use in connection with the present invention basically comprises a carburetion system 17, a spark distributing system 36 and a closed crankcase ventilating system 50.

Engine 6 is of conventional design and may comprise a cylinder block 8 having eight cylinders arranged therein. Lubrication is provided to pistons which reciprocate within the cylinders by a crankcase 10 which is normally filled with engine oil. Combustion chambers above the pistons are controlled by a conventional set of exhaust valves and intake valves that are covered by valve covers 12 and 14. A fuel-air mixture is supplied to the engine by an intake manifold 16. In a well known manner, the pistons operate on a four stroke cycle in which the pistons and intake valves cooperate in order to maintain the intake manifold at a partial vacuum that draws the fuel-air mixture into the combustion chambers.

Carburetion system 17 comprises an air cleaner 18 which filters the air drawn into an air horn or inlet 22 of a standard carburetor 20. During the engine warm-up cycle, the amount of air flowing through the air inlet is controlled by a conventional choke valve 24. The carburetor also comprises a carburetor throat 26 (FIG. 2) that includes a venturi 28 in which air is mixed with fuel from a carburetor bowl (not shown) to form a fuel-air mixture.

A conventional throttle valve 30 in the form of a circular disc is rotatably mounted in the throat of the carburetor by a pin 32 which defines an axis of rotation 34. The position of the throttle valve controls the flow of the fuel-air mixture into an intake chamber 35 which comprises the portion of the carburetor throat below throttle valve 30, as well as intake manifold 16.

Spark distributing system 36 comprises a vacuum advance control port 38 which is formed by a cylindrical tubular fitting 40. When throttle valve 30 is in the idle position shown in solid lines in FIG. 2, port 38 is exposed to atmospheric pressure through the carburetor throat so that the port is held at atmospheric air pressure. As throttle valve 30 is opened to cruise position C shown in phantom in FIG. 2, port 38 is shielded from atmospheric pressure so that the partial vacuum existing in intake manifold 16 reduces the pressure in the port. However, when the throttle is advance to open position O shown in phantom in FIG. 2, port 38 is again exposed to the atmosphere through the carburetor throat, so that the port is held at atmospheric pressure.

The pressure maintained in port 38 by the position of throttle valve 30 is communicated to a conventional vacuum advance unit 45 by hoses 42 and 44. Unit 45 controls a conventional spark distributor 46 which includes a set of breaker points that create high potential sparks from a coil 48. In a well-known manner, the sparks are distributed to spark plugs that fire the fuel-air mixture in each of the combustion chambers. The ignition wires connected to distributor 46 and coil 48 have been omitted to more clearly show the parts relevant to the present invention.

Figure 2:
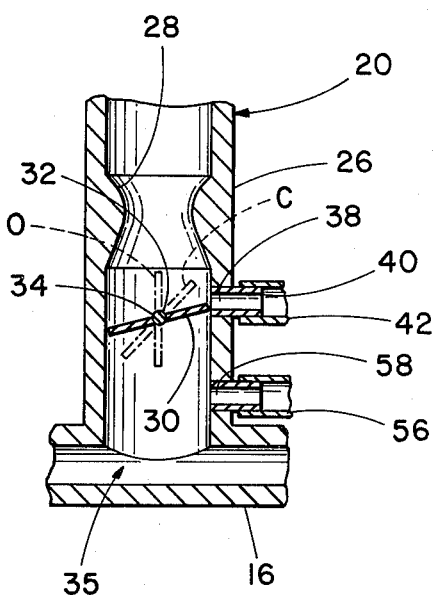
FIG. 2 is a fragmentary, schematic, cross-sectional view of the carburetor shown in FIG. 1.

Closed crankcase ventilating system 50 comprises a positive crankcase ventilator valve 52 which is in communication with crankcase 10. Valve 52 comprises a conventional check valve which normally allows crankcase fumes to be drawn through hoses 54 and 56 into a tubular fitting 58 that is drilled into intake chamber 35 (FIG. 2).

Figure 4:
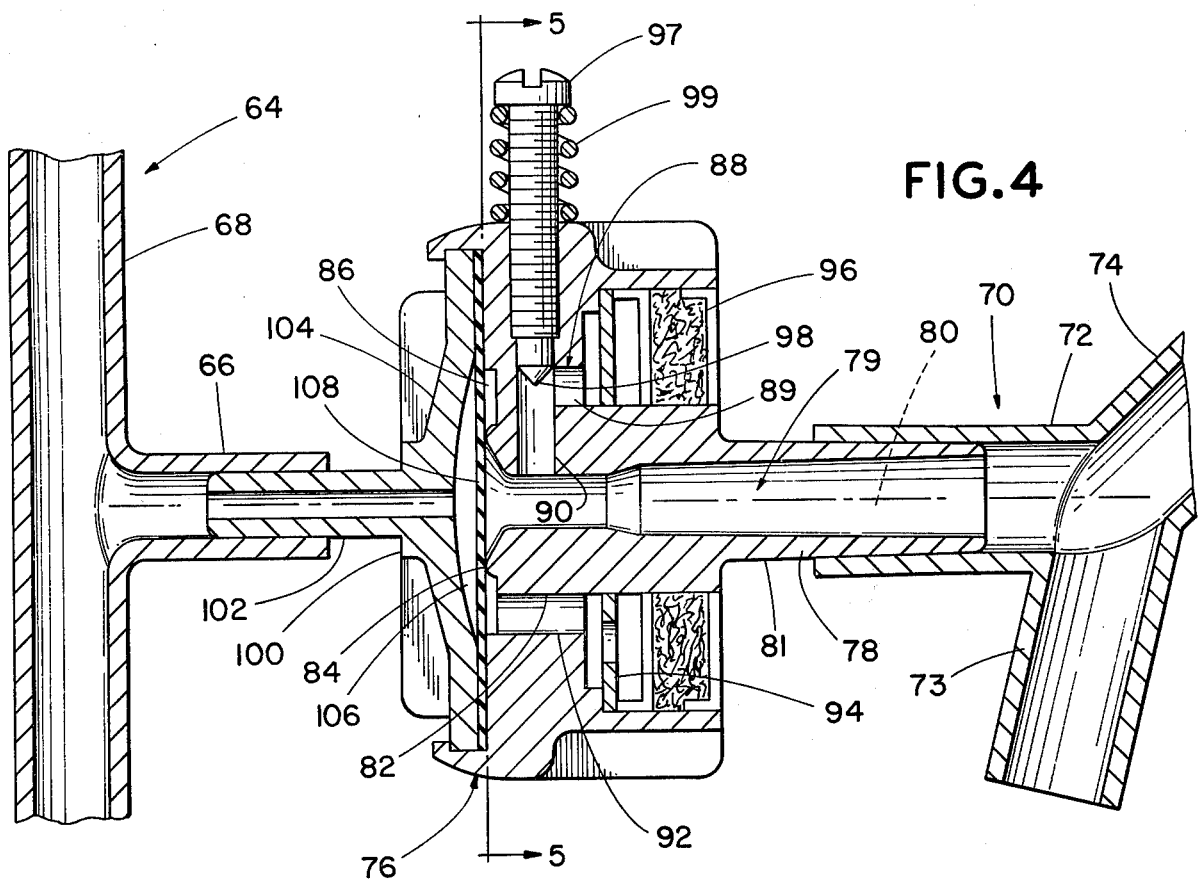
FIG. 4 is a cross-sectional view taken along line 4—4 in FIG. 3 in which fittings are shown connected to the ends of the air bleed system.

Referring to FIGS. 1 and 4, a preferred form of self-modulating air bleed system 62 made in accordance with the present invention and adapted for use in connection with engine 6 comprises a hollow T-fitting 64 having a neck 66 and a body 68. The system also utilizes a hollow Y-fitting 70 having branches 72, 73 and a neck 74. The T-fitting and the Y-fitting are interconnected with the hoses in the manner shown in FIG. 1.

Figure 3:
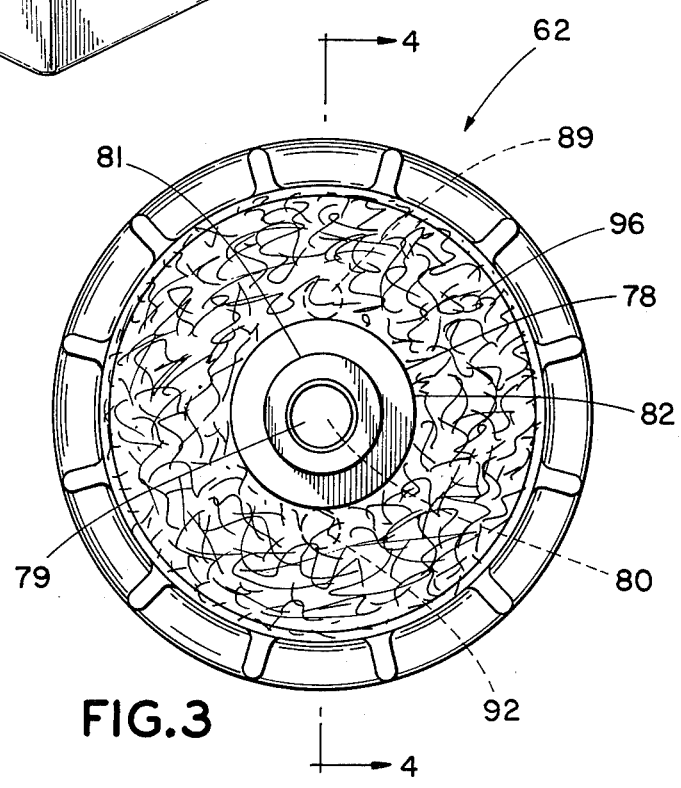
FIG. 3 is a front elevational view of the air bleed system shown in FIG. 1.
Figure 5:
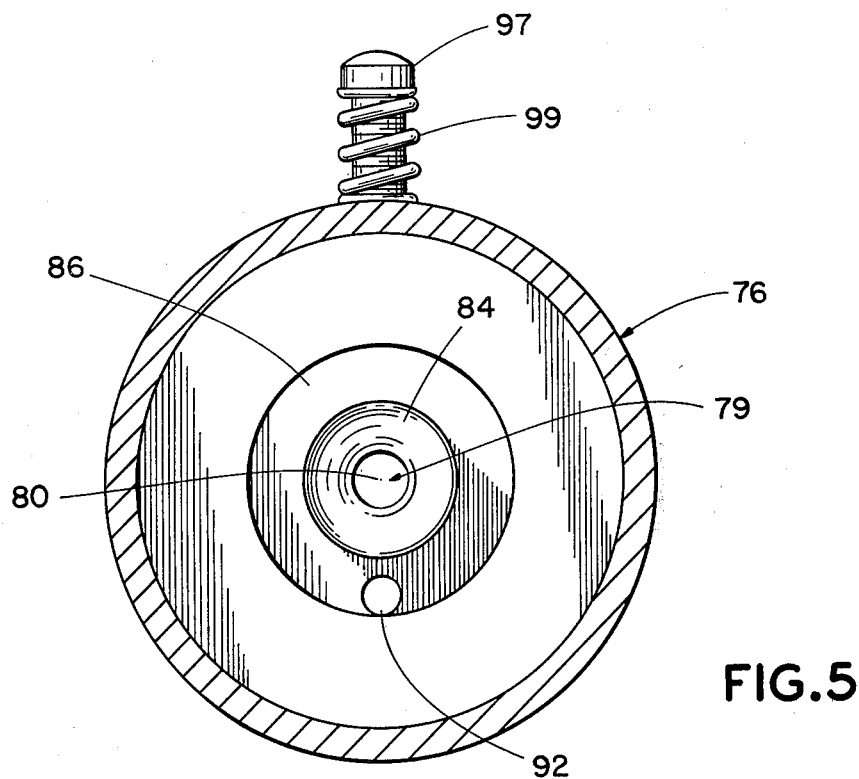
FIG. 5 is a cross-sectional view taken along line 5—5 in FIG. 4 with the fittings removed.

Referring to FIGS. 3–5, system 62 also comprises a valve body 76 including a cylindrical tube 78 which defines a chamber 79 having a center line 80. Tube 78 has an outer end portion which defines a cylindrical stem surface 81 and a cylindrical retainer surface 82. The tube has an inner end portion which defines a circular valve seat 84 and a ring-shaped recess 86 which surrounds the valve seat and is concentric with the valve seat. A cylindrical channel 88 is drilled into the valve body and consists of a cylindrical horizontal leg 89 and a cylindrical vertical leg 90. Another cylindrical channel 92 is drilled parallel to center line 80 into recess 86. Both channels 88 and 92 communicate with the atmosphere through a disc or baffle 94 and a toroidal filter 96.

The size of channel 88 may be adjusted by an adjustment screw 97 having a conical tip 98 which enters the junction between channel legs 89 and 90. Screw 97 is biased outward away from the valve body by a coil spring 99.

As best shown in FIG. 4, system 62 also comprises a cover 100 having a hollow stem 102 and a dome 104 that defines a chamber 106 located opposite chamber 79. A flexible diaphragm 108 is normally biased against valve seat 84 in order to separate chambers 79 and 106. When diaphragm 108 is biased against valve seat 84, air is prevented from entering chamber 79 by way of channel 92 and recess 86.

The preferred form of operation and the method aspect of the preferred embodiment will now be described. In order to install system 62 in the engine shown in FIG. 1, T-fitting 64 and Y-fitting 70 are attached to stem 102 and tube 78 in the manner shown in FIG. 4. Hoses 54 and 56 are then cut and inserted over the ends of the Y-fitting in the manner shown in FIG. 1. Likewise, hoses 42 and 44 are cut and inserted over opposite ends of the T-fitting body 68 in the manner shown in FIG. 1.

The engine is started, and the throttle valve is moved to the idle position shown in solid lines in FIG. 2. Adjustment screw 97 is then adjusted to reduce exhaust pollutants to the desired value. While the engine is idling, or anytime at which the throttle valve is in the idle position, diaphragm 108 is biased against valve seat 84 so that no air flows through channel 92 into chamber 79. However, air continuously flows through channel 88 and through hose 56 and fitting 58 to intake manifold 16.

When throttle valve 30 is moved to the cruise position C (FIG. 2), the reduced pressure created in port 38 moves diaphragm 108 to the left (as shown in FIG. 4) away from valve seat 84 so that air is drawn into chamber 79 through channel 92 and recess 86. At this point in time, air is bled into the intake manifold through both channel 88 and channel 92.

When throttle valve 30 is moved to open position O (FIG. 2), port 38 again is raised to atmospheric air pressure so that diaphragm 108 again is biased against valve seat 84 to prevent air from flowing through channel 92 into chamber 79; however, air continues to flow through channel 88 into chamber 79 and intake manifold 16.

By using the foregoing method and apparatus, exhaust pollutants may be substantially reduced by a system which is economical and convenient to install on conventional vehicles.

Those skilled in the art will recognize that a single preferred embodiment has been disclosed and that this embodiment may be altered and modified without departing from the true spirit and scope of the invention as defined in the accompanying claims.

What is claimed is:

1. In an internal combustion engine comprising a carburetor throat for producing a fuel-air mixture, an intake chamber maintained at a partial vacuum by the engine, a throttle valve located between the carburetor throat and the intake chamber, a spark distributor including a vacuum-controlled spark advance unit, a spark advance control port in the carburetor throat adjacent the throttle valve, a first conduit for connecting the spark advance unit to the control port, and a second conduit connected to the intake chamber, improved apparatus for automatically regulating the amount of air admitted into the intake chamber in response to varying engine load conditions comprising in combination:

a valve body for defining a first chamber, a second chamber and a valve seat, first channel means for continuously admitting air into the second conduit, means for manually adjusting the size of the first channel means in order to regulate the amount of air flowing into the intake chamber through the first channel means, second channel means for admitting air into the second conduit, separation means for cooperating with the valve seat to separate the first chamber, the second chamber and second channel means, said separation means being moved from the valve seat in response to an increasing vacuum signal differential and being moved toward the valve seat in response to a decreasing vacuum signal differential, third conduit means for connecting the second chamber to the second conduit, and fourth conduit means for connecting the first chamber to the first conduit, said separation means being movable away from the valve seat to permit air flow into the second chamber via the second channel means when the vacuum signal differential increases, whereby in operation, the combustion of the fuel-air mixture is improved and exhaust emissions are reduced.

2. Apparatus, as claimed in claim 1, wherein the engine further comprises a crankcase and a vent for transmitting crankcase fumes, and wherein the second conduit connects the crankcase vent to the intake chamber.

3. Apparatus, as claimed in claim 1, wherein the first channel means comprises an orifice in the valve body extending into the second chamber.

4. Apparatus, as claimed in claim 3, wherein the means for manually adjusting comprises:
 a threaded hole terminating in the orifice, and
 a screw threaded into the hole.

5. Apparatus, as claimed in claim 1, wherein the separation means comprises a flexible diaphragm in said valve body.

6. Apparatus, as claimed in claim 5, wherein the first chamber and second chamber are arranged on opposite sides of the diaphragm means.

7. Apparatus, as claimed in claim 6, wherein the valve body comprises a cylindrical tube defining the second chamber, said tube having a circular end portion defining the valve seat.

8. Apparatus, as claimed in claim 7, wherein the second channel means comprises:
 a ring-shaped channel in contact with the diaphragm means arranged concentric to and surrounding the tube; and
 an orifice in the valve body connecting the atmosphere to the ring-shaped channel.

9. Apparatus, as claimed in claim 7, and further comprising a toroidal filter surrounding the tube and disposed between the atmosphere and the first and second channel means, whereby air entering the first and second channel means is filtered.

10. A method of automatically regulating the amount of air admitted into the intake chamber of an internal combustion engine having a carburetor throat for producing a fuel-air mixture, a throttle valve located between the carburetor throat and the intake chamber, said throttle valve being rotatable into an idle position in which the flow of the fuel-air mixture into the intake chamber is substantially reduced and rotatable into an open position in which the flow of the fuel-air mixture into the intake chamber is substantially unrestricted, a spark distributor including a vacuum-controlled spark advance unit and a control port in the carburetor throat adjacent the throttle valve, a first conduit for connecting the spark advance unit to the control port, an engine crankcase, a vent for transmitting crankcase fumes, a second conduit for connecting the crankcase vent to the intake chamber, a first channel between the atmosphere and the second conduit, and a second channel between the atmosphere and the second conduit, said method comprising the steps of:
 opening the first channel so that air is continuously admitted to the intake chamber;
 closing the second channel in response to a vacuum signal when the throttle valve is in the idle position and the open position; and
 opening the second channel when the throttle valve is between the idle position and the open position in response to a higher vacuum signal whereby combustion of the fuel-air mixture is improved and exhaust emissions are reduced.

11. A method, as claimed in claim 10, and further comprising the step of adjusting the size of the first channel to regulate the amount of air flowing into the intake chamber when the engine is idling.

* * * * *